(12) United States Patent
Carey (10) Patent No.: US 10,430,567 B2
(45) Date of Patent: Oct. 1, 2019

(54) CUSTOMIZABLE FIRMWARE BASED ON ACCESS ATTRIBUTES

(71) Applicant: INTERNATIONAL BUSINESS MACHINES CORPORATION, Armonk, NY (US)

(72) Inventor: Brian P. Carey, Endwell, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 15/409,030

(22) Filed: Jan. 18, 2017

(65) Prior Publication Data

US 2018/0203708 A1 Jul. 19, 2018

(51) Int. Cl.
*G06F 21/31* (2013.01)
*G06F 9/451* (2018.01)

(52) U.S. Cl.
CPC .............. *G06F 21/31* (2013.01); *G06F 9/451* (2018.02)

(58) Field of Classification Search
None
See application file for complete search history.

(56) References Cited

U.S. PATENT DOCUMENTS

| 7,108,177 | B2 | 9/2006 | Brookner | |
|---|---|---|---|---|
| 8,198,994 | B2 | 6/2012 | Ferren et al. | |
| 2002/0123843 | A1* | 9/2002 | Hood | G01C 21/20 701/433 |
| 2005/0071234 | A1* | 3/2005 | Schon | G06Q 10/08 705/22 |
| 2006/0294388 | A1 | 12/2006 | Abraham et al. | |
| 2007/0101419 | A1* | 5/2007 | Dawson | G06F 21/32 726/9 |
| 2008/0291213 | A1* | 11/2008 | Bhogal | G09G 5/028 345/589 |
| 2011/0184865 | A1* | 7/2011 | Mon | G06Q 20/1085 705/43 |
| 2012/0311019 | A1* | 12/2012 | Raman | G06Q 20/3278 709/203 |
| 2013/0238511 | A1* | 9/2013 | Van Der Veen | G06Q 10/04 705/306 |

(Continued)

FOREIGN PATENT DOCUMENTS

WO 2014005004 A1 1/2014

OTHER PUBLICATIONS

Liou et al., "A Sophisticated RFID Application on Multi-Factor Authentication", 2011 Eighth International Conference on Information Technology: New Generations, Apr. 11, 2011, pp. 1-6.

*Primary Examiner* — Danny Chan
(74) *Attorney, Agent, or Firm* — Cantor Colburn LLP; Edward Wixted (57) ABSTRACT

Embodiments include validating a user for performing a service procedure for a system and customizing the system for the user for the service procedure. An example computer-implemented method includes validating authorization of the user based on authentication data from a tag uniquely identifying the user. The method further includes receiving attribute data for the user from the tag. The method further includes generating and/or adapting a set of service procedure instructions that are customized for the user based on the attribute data. The method further includes displaying the set of service procedure instructions that are customized for the user.

14 Claims, 7 Drawing Sheets

(56) References Cited

U.S. PATENT DOCUMENTS

| | | | |
|---|---|---|---|
| 2016/0125716 A1* | 5/2016 | Ribble | G08B 21/0461 |
| | | | 340/573.4 |
| 2016/0285883 A1* | 9/2016 | Sawa | G05B 19/12 |
| 2016/0320935 A1* | 11/2016 | Shin | G06F 3/0484 |
| 2017/0213273 A1* | 7/2017 | Dietrich | G06Q 30/0631 |
| 2017/0245806 A1* | 8/2017 | Elhawary | G16H 20/30 |
| 2017/0308965 A1* | 10/2017 | Morris | B67D 7/04 |
| 2018/0086347 A1* | 3/2018 | Shaikh | B60W 40/09 |
| 2018/0218585 A1* | 8/2018 | Schwabenthan | B66C 13/18 |
| 2018/0369637 A1* | 12/2018 | Hoang | G01P 1/02 |

* cited by examiner

CUSTOMIZABLE FIRMWARE BASED ON ACCESS ATTRIBUTES

BACKGROUND

The present application relates to computer technology, and more specifically, to the firmware of a computer system, such as a mainframe, which is customizable according to attributes associated with a user that is accessing the computer system.

A mainframe computer typically includes a graphical user interface that facilitates a user to command numerous actions and execute computer programs. The programs include a computer program code, referred herein as a service element, which may be a combination of firmware/software code, and which only an authorized user, such as a customer engineer from the manufacturer, may run. For example, the service element may facilitate the authorized user to install, relocate, diagnose, and/or repair the computer system and any of its components. Typically, the service element is part of the mainframe computer and can only be accessed at the physical location of the mainframe itself. Accordingly, when the computer system is to be serviced, the authorized user has to log into the service element to perform the service procedures, and typically, to maintain the validity of the manufacturer's service contract, all service procedures on the mainframe are to be performed by an authorized user only. If a customer or other user tries to perform such procedures, they risk data loss, system degradation, system failure, system/personal injury, and or invalidating the service contract. To ensure that only the authorized user accesses the service element, the system provides access based on an authentication using a combination of a user identification and password, and a physical radio frequency identification (RFID) tag.

The one or more embodiments, thus facilitate a system to access and use attribute data of the user, who is authorized to execute a service procedure for the system, and to show personalized service procedure flows to the user. The system accesses the attribute data from the unique tag that the user carries. A personalized service procedure helps the user to service the system more efficiently. For example, a user with a preferred language is shown service procedures using the preferred language. Further, a user with a known disability, such as not being able to see colors, is shown procedures where color is not the delineation used to distinguish system components. Further, a user may have a lifting restriction, such as because of recent surgery or any other physical limitation, that is different from the majority of users. Accordingly, the firmware may adapt the system or display instructions to address such limitations/restrictions. For example, a user with physical differences is shown specific text and procedures, such as for additional tools to address accessing system components that they may not be able to access because of the restrictions/limitations. Thus, the technical solutions facilitate the users to execute the service procedures in an efficient manner, thereby reducing system downtime.

SUMMARY

According to one or more embodiments, a computer implemented method for validating a user for performing a service procedure for a system and customizing the system for the user for the service procedure includes validating authorization of the user based on authentication data from a tag uniquely identifying the user. The method further includes receiving attribute data for the user from the tag. The method further includes generating and/or adapting a set of service procedure instructions that are customized for the user, based on the attribute data. The method further includes displaying the set of service procedure instructions that are customized for the user.

The method may further include receiving authentication data for the user from the tag, and validating authority of the user based on the authentication data, wherein the validating is performed prior to receiving the attribute data. The computer implemented method may further include adjusting a position of one or more components of the system based on the attribute data of the user. The computer implemented method may further include determining an experience level of the user, and in response to the experience level being below a predetermined threshold, generating the set of service procedure instructions includes, adding one or more service instructions to the set of service procedure instructions.

The computer implemented method may further include determining a maximum lift of the user, and in response to the maximum lift being below a predetermined value, generating the set of service procedure instructions further includes, adding instructions identifying a lift-support tool to be used.

The computer implemented method may further include determining a color-blindness of the user, and in response to the user being color blind, generating the set of service procedure instructions further includes, replacing color illustrations in the set of service procedure instructions with grayscale illustrations. In addition, or alternatively, the service procedures display videos specific to the user attributes. For example, the videos may be customized for color blindness, customized for a user with a low experience count, or customized for a user shorter (or taller) than a predetermined height, to facilitate the user to perform a repair or other service procedure.

According to one or more embodiments, a system is described for validating a user for performing a service procedure for a system and customizing the system for the user for the service procedure. An example system includes a tag uniquely associated with the user, the tag including authentication data and attribute data for the user. The system further includes a tag reader configured to access data stored in the tag. The system further includes a processor, in communication with the tag reader. The processor receives attribute data for the user from the tag via the tag reader. The processor generates a set of service procedure instructions for the service procedure, the set of service procedure instructions being customized for the user based on the attribute data. The processor further displays the set of service procedure instructions that are customized for the user.

In one or more examples, the processor may further generate a set of service procedure instructions in a preferred language of the user, the preferred language being determined based on user attributes for the user stored in the tag.

In one or more examples, the processor may further receive the authentication data for the user from the tag via the tag reader, and validate authorization of the user based on the authentication data, wherein the validation is performed prior to generation of the set of service procedure instructions. In one or more examples, the processor may further, periodically monitors the presence of the tag within a predetermined proximity of the system by revalidating the authorization of the user based on the authentication data from the tag.

In one or more examples, the processor may further adjust a position of one or more components of the system based on the attribute data of the user.

In one or more examples, the processor may further determine an experience level of the user, and in response to the experience level being below a predetermined threshold, generate the set of service procedure instructions by, adding one or more service instructions to the set of service procedure instructions.

In one or more examples, the processor may further determine a maximum lift of the user, and in response to the maximum lift being below a predetermined value, generate the set of service procedure instructions further by, adding instructions identifying a lift-support tool to be used.

In one or more examples, the processor may further determine a color-blindness of the user, and in response to the user being color blind, generate the set of service procedure instructions by, replacing color illustrations in the set of service procedure instructions with grayscale illustrations.

According to one or more embodiments, a computer program product for validating a user for performing a service procedure for a system and customizing components of the system during the service procedure is described. The computer program product includes a computer readable storage medium that in turn includes computer executable instructions. The computer readable storage medium includes instructions to receive attribute data for the user from the tag via the tag reader. The computer readable storage medium includes instructions to generate a set of service procedure instructions for the service procedure, the set of service procedure instructions being customized for the user based on the attribute data. The computer readable storage medium further includes instructions to display the set of service procedure instructions that are customized for the user.

In one or more examples, the computer readable storage medium further includes instructions to receive the authentication data for the user from the tag, and validate authorization of the user based on the authentication data, wherein the validation is performed prior to generation of the set of service procedure instructions.

In one or more examples, the computer readable storage medium further includes instructions to adjust a position of one or more components of the system based on the attribute data of the user.

In one or more examples, the computer readable storage medium further includes instructions to determine an experience level of the user, and in response to the experience level being below a predetermined threshold, generate the set of service procedure instructions by, adding one or more service instructions to the set of service procedure instructions.

In one or more examples, the computer readable storage medium further includes instructions to determine a height of the user. In response to the user height being below (or above) a predetermined value, the instructions facilitate generation and display of an additional set of service procedure instructions, by adding instructions with illustrations/videos showing special tools, such as a step-stool or ladder, to be used for the user to perform the service procedure.

In one or more examples, the computer readable storage medium further includes instructions to determine a maximum lift of the user, and in response to the maximum lift being below a predetermined value, generate the set of service procedure instructions further by, adding instructions identifying a lift-support tool to be used.

In one or more examples, the computer readable storage medium further includes instructions to determine a color-blindness of the user, and in response to the user being color blind, generate the set of service procedure instructions by, replacing color illustrations in the set of service procedure instructions with grayscale illustrations.

In one or more examples, the tag may be an RFID tag, and the tag reader may be an RFID reader. Alternatively, or in addition, the tag may be a communication device such as a smartphone, a wearable device, a personal digital assistant, or any other device that communicates with the system.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Described in detail below, technical solutions for customizing access to a system for an authorized user possessing a pre-authorized tag. The tag has to be within a minimum read distance of reader coupled to, integrated in, or associated with the system. If the tag identification number or other applicable data on the tag corresponds to the data stored in a security database, access to the system is granted to the user. Further, based on the attributes associated with the authorized user that are stored in the identification tag, the system adapts how the access is provided to the authorized user. For example, the system may adapt the graphical user interface (GUI) and/or access locations of physical components of the computer based on the attributes of the authorized user. As such the technical solutions are rooted in and/or tied to computer technology in order to overcome a problem specifically arising in the realm of computers, specifically computer firmware.

A security access system for a computer which requires a user to be within a certain predetermined radius of a computer, for example three feet, may be used alone or in conjunction with other types of security access systems, such as passwords, mobile keys, and biometric sensors.

Requiring a user to be physically located near a computer may be advantageous. For example, a remote hacker would not be able to access the computer. In addition, if the computer has a fixed location, it may be monitored by cameras or security guards, thus increasing the number of security layers available to detect security fraud.

Figure 1:
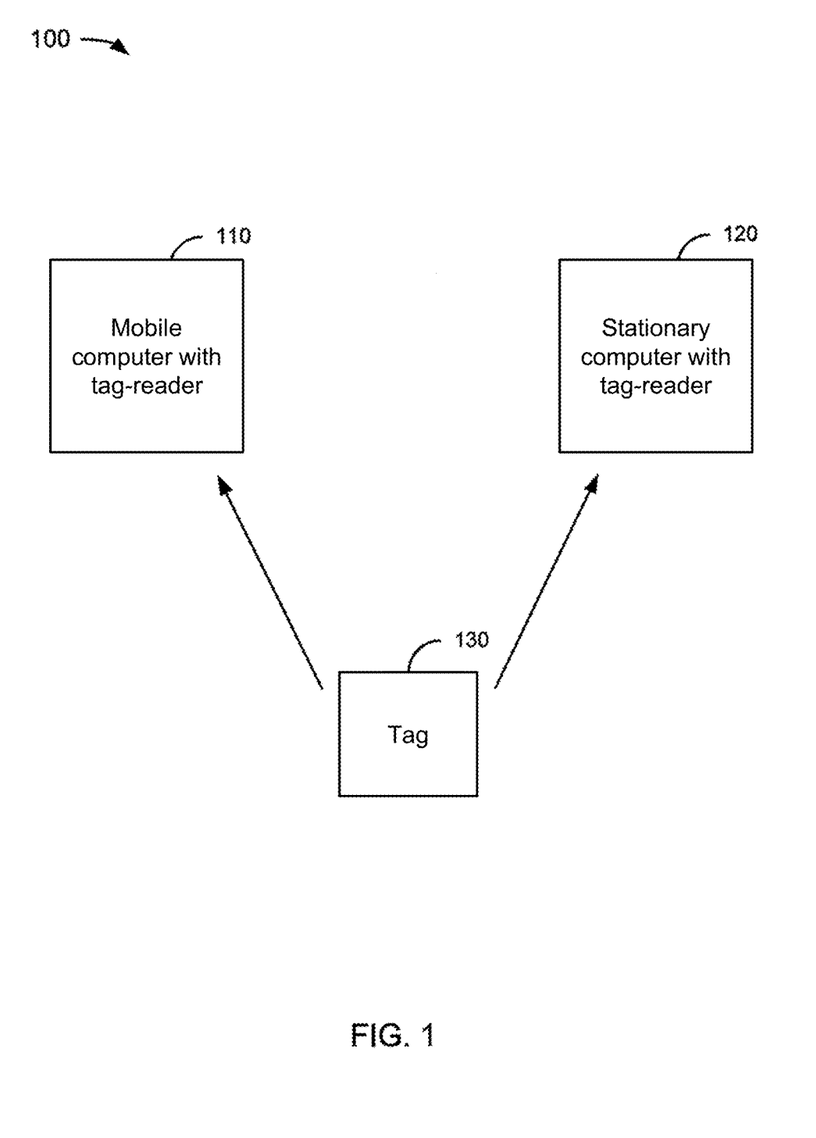
FIG. 1 illustrates a block diagram of an example system using the proximity of a tag to grant security access to a computer in accordance with one or more embodiments.

FIG. 1 illustrates a block diagram of an example system using a tag proximity to grant security access to a computer in accordance with one or more embodiments. As shown in FIG. 1, a security access system 100 requiring proximity to a computer may be established using a tag reader and tag system. The systems to be protected, whether stationary 120 or mobile 110, may contain or be closely coupled to the tag reader. Thus, a tag 130 within a certain radius of the tag reader may also be substantially within the same radius of the system. The authorized user to be granted access to the system may be provided the tag 130 having stored therein pre-authorized identification numbers. The stationary system 120 may be a mainframe computer, a desktop computer, or any other type of computer. The stationary system 120 may be any other type of system, such as a vehicle, a data repository, a heating, ventilating, and air conditioning (HVAC) system, a plumbing system, or any other system that needs servicing and/or repairs. The mobile computer 110 may be a tablet computer, a laptop computer, a smartphone, or any other type of computer.

One or more of the embodiments described further use a computer as an example of the system being accessed by a user. The embodiments further use RFID as an example implementation for the tag and tag reader pair. However, it should be noted that in other examples, the system may be any other system, and that the tag and tag reader may use other techniques to communicate, such as BLUETOOTH™, Z-WAVE™ or any other communication protocols or a combination thereof. Alternatively, or in addition, the tag may be a communication device such as a smartphone, a wearable device, a personal digital assistant, or any other device that communicates with the system via a network communication protocol.

Figure 2:
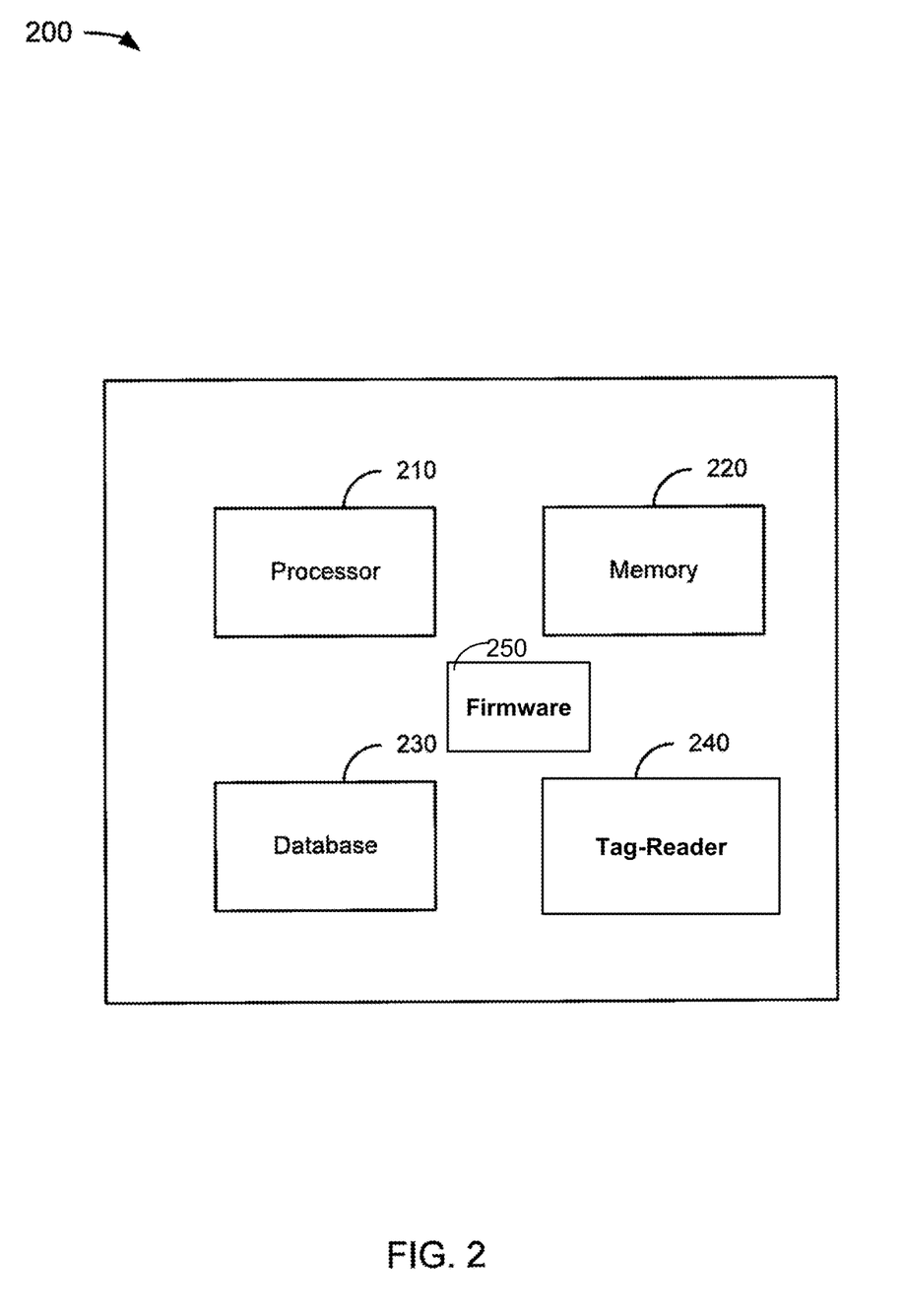
FIG. 2 illustrates a block diagram of an example computer that uses a tag proximity to grant security access in accordance with one or more embodiments.

FIG. 2 illustrates a block diagram of an example computer system 200 that uses RFID tag proximity to grant security access in accordance with one or more embodiments. The system 200 is applicable to both the fixed computer 120 and mobile laptop computer 110. Note that FIGS. 1 and 2 and the associated discussion provide a brief, general description of a suitable computing environment in which technical solutions described herein can be implemented. Although not required, aspects of the technical solutions are described in the general context of computer-executable instructions, such as routines executed by a general-purpose computer, e.g., stationary and mobile computers. Those skilled in the relevant art will appreciate that these concepts can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, server computers, and the like. Indeed, the terms "computer" and the like are generally used interchangeably herein, and refer to any of the above devices and systems, as well as any data processor.

Aspects of the technical solutions can be embodied in a special purpose computer or data processor that is specifically programmed, configured, or constructed to perform one or more of the computer-executable instructions explained in detail herein. Aspects of the technical solutions can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. For example, the stationary computer 120 may be coupled via a network to other computers (not shown).

Aspects of the technical solutions may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the technical solutions may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

As shown in FIG. 2, the computer system 200 includes the following elements for establishing a tag proximity security system: one or more processors 210, memory units 220, a database 230, and a tag reader 240. As described earlier the following description uses an RFID tag reader 240 to describe an example implementation for the tag 130 and tag reader 240 pair. However, in other examples the tag reader 240 may be a communication device that can communicate with the tag 130 using any other communication protocol and/or method, such as BLUETOOTH™, NFC™ Z-WAVE™ and the like.

The computer 200 may include other elements (not shown), including input or output elements such as a printer, plotter, audio speakers, tactile or olfactory output devices, network connection, wireless transceiver, keyboard, pointing device (e.g. mouse), microphone, joystick, pen, game pad, scanner, digital camera, video camera, among others. The system 200 may further include components such as user interface, hardware compartments, hardware shelves, and the like.

The service procedures performed by the authorized user, such as the customer engineer, may include one or more service scenarios, which in turn include interaction with the one or more components of the system 200. Depending on the state of the system 200, the experience and expertise of the authorized user, and other environment factors, the service scenarios can take a variable amount of time, such as less than an hour, up to an entire day or more to complete. The authorized user may have to use safety equipment, proprietary tools, height adjusting shelves and ladders, visual checks, user input, and other tools and interaction to service the system 200. In one or more example, the system 200 may include guided service procedures that provide step by step panels that display text, graphics, videos, or other type of media for each service task to be completed for a specific repair scenario for the system 200. Such service procedures may be part of software/firmware of the system 200. In one or more examples, the service procedures light system indicators to indicate which system hardware to target, and power components (or entire subsystems) off/on at specific time-points during the repair procedure. In one or more examples, the firmware adapts or adjusts the procedure depending on user input and which user actions were verified as having been completed successfully by the system 200. In one or more examples, time can be critical during specific service procedures that require the entire system 200 to be powered off or at least run in a degraded, low power mode. During such scenarios, the system 200 may be afforded a limited amount of time for obtaining credentials and other information from the authorized user who is on-call and summoned to a customer location where the system 200 is located to perform the service procedure, because the goal of a service call is to repair or upgrade the system 200 as quickly as possible as the system downtime can equate to lost revenue for the customer. Accordingly, customizing the system 200 according to attributes and/or preferences of the authorized user who is on-call to perform the service procedures may facilitate completion of the service procedure as quickly as possible.

However, no two authorized users are alike; they may come from different backgrounds, speak different languages, work in different regions, have different experience levels, and may travel outside of their assigned region as needed. Further, collecting such information from the authorized user at the time of service may take too long because each authorized user may have to answer several pages of questions at each service call, and as described earlier time is of the essence. The technical solutions described herein address such a technical problem and facilitate the system 200 to automatically detect the attributes/preferences of the authorized user who is on-call, and customize the accessibility of the system 200 accordingly.

For example, the processor 210 may run RFID reader applications that may be stored in the memory 220. The processor 210 may also compare identification data read from an RFID tag to security access information in a database 230. Memory 220 may include but is not limited to, RAM, ROM, and/or any combination of volatile and non-volatile memory. The database 230 may be stored in the memory 220, and may include RFID tag identification data for users authorized to access the computer or applications on the computer. Alternatively, the database 230 may contain other identifying tag information configurable on the RFID tags and readable by the RFID reader 240. The tag information may be either encrypted or not encrypted using known cryptographic protocols or RFID standards. If the information is encrypted, the processor 210 may decrypt the information read and stored by the RFID reader 240 in memory 220 by using a decryption key.

For example, the RFID tag 130 includes attributes of the authorized user. Besides access level authority, the attribute data may include a user's personal information that is relevant to the user's interaction with the system 200. In one or more examples, the attribute information is used by the system 200 to grant access to specific service applications and to customize the firmware experience for the user, based on the attributes. For example, the attributes may include age, height, maximum reach, lifting limit, preferred written/ spoken language, work restrictions, disabilities, color-blindness, handedness (left/right), and other physical attributes of the authorized user. The RFID tag 130 may further include preferences of the user such as system color preference, font-size preferences, font-type preferences, and the like. In one or more example, the RFID tag 130 includes separate sets of user preferences for specific service procedures, respectively. For example, the authorized user may prefer a first set of preferences for a first service procedure, where the first set of preferences includes a first font-size and a first color; while, for a second service procedure, the authorized user may prefer a second set of preferences, such as a second font-size, a second color, and a second font-type. It is understood that in other examples, the preferences may include different types of user preferences than those listed above.

The RFID reader 240 includes at least one antenna for transmitting RF signals to RFID tags and/or scanning for or receiving RF signals from RFID tags. The RFID reader 240 reads identification data associated with RFID tags within range. The RFID reader 240 may be programmed to respond only to RFID tags within a selectable distance, for example three feet, although the range can certainly be adjusted to fit specific user needs. The RFID reader 240 may contain logic for determining the distance an RFID tag is from the reader based upon the received signal strength. Alternatively, the RFID reader 240 may include two or more antennas that have known separations. Based upon the signal strength received at each of the antennas and the lag time between detecting an RFID tag's presence at each antenna, it is possible to triangulate the location of the RFID tag to give higher resolution as to the proximity of the RFID tag from the reader. Alternatively or additionally, the tag 130 may be incorporated into another device, such as a mobile phone that has location determining capabilities, such as a global positioning system (GPS), where such determined location may be communicated to the computer 200 and/or the RFID reader 240. Indeed, the tag 130 may be incorporated into any device, or even into a human.

The system 200 further includes firmware 250 that is responsible for facilitating the authorized user to execute the one or more service procedures for the system 200. Accordingly, the firmware 250 includes one or more computer executable instructions that provide control, monitoring, and data manipulation of one or more software and hardware components of the system 200. The firmware 250 provides an interface, such as a graphical user interface (GUI) that the authorized user may access for executing the service procedures. In one or more examples, the firmware 250 is stored in non-volatile memory devices such as ROM, EPROM, or flash memory, separate from the memory 220. Alternatively, or in addition, the firmware 250 may be stored on the memory devices that are part of the memory 220. In one or more examples, the processor 210 executes the one or more computer executable instructions of the firmware 250. Alternatively, or in addition, the system 200 may include a separate processor that is dedicated to execute the instructions from the firmware 250.

In one or more examples, the firmware 250 communicates with the RFID reader 240 to authenticate the RFID tag 130 and provide access only to the authorized user using a multi-factor authentication. Further yet, the firmware 250, determines an authorization level of the authorized user based on the information stored on the RFID tag 130 of the authorized user. The firmware 250 facilitates the authorized user to access only a subset of service procedures that is associated with the authorization level. In other words, the firmware 250 limits access to the subset of the service procedures that is associated with the authorization level. For example, at a specific authorization level, the firmware 250 may prevent the authorized user from installing one or more computer program products, such as firmware updates, on the system 200. Alternatively, or in addition, the firmware 250 may prevent the authorized user from accessing one or more hardware components of the system 200 according to the authorization level.

In addition to facilitating authorized access to the system 200, the RFID reader 240 reads the attributes and/or preferences of the authorized user from the RFID tag and customizes one or more components of the computer system 200 according to the attributes. For example, the firmware that drives the service procedures of the system 200 changes the written instructions, graphics, videos, and guided panel flows depending on the attributes and/or preferences that are read from the RFID tag 130 of the authorized user. For example, the firmware customizes the system 200 according to the experience, physical attributes, or limitations of the authorized user that is on-call, by programmatically adapting the system 200, and without having to ask the authorized user questions at one or more decision points. Thus, the technical solutions herein facilitate a multi-factor access control at regular intervals, along with the customized software/firmware service procedures.

For example, the firmware 250 running on the system 200, using the RFID reader 240 authenticates the authorized user initially using a multi-factor authentication, such as using a username-password pair, in combination with the RFID tag 130 of the authorized user. In one or more examples, the system 200 verifies that the RFID tag 130 matches the user access level for executing one or more service procedures of the system 200. Accordingly, the firmware 250 checks and confirms that the authorized user is physically present at the system 200 and that he/she has at least the prescribed credentials to log in and service the system 200. Further, besides the initial login check, the firmware 250 checks the authorized user's access at multiple intervals (regular or random) throughout execution of the service procedures, to ensure that the authorized user is present during the entire service procedure. Thus, the firmware 250 adds another level of security to the accessibility of the computer system 200 by ensuring that the authorized user has the RFID tag 130 with him/her at all times when using the system 200.

Figure 3:
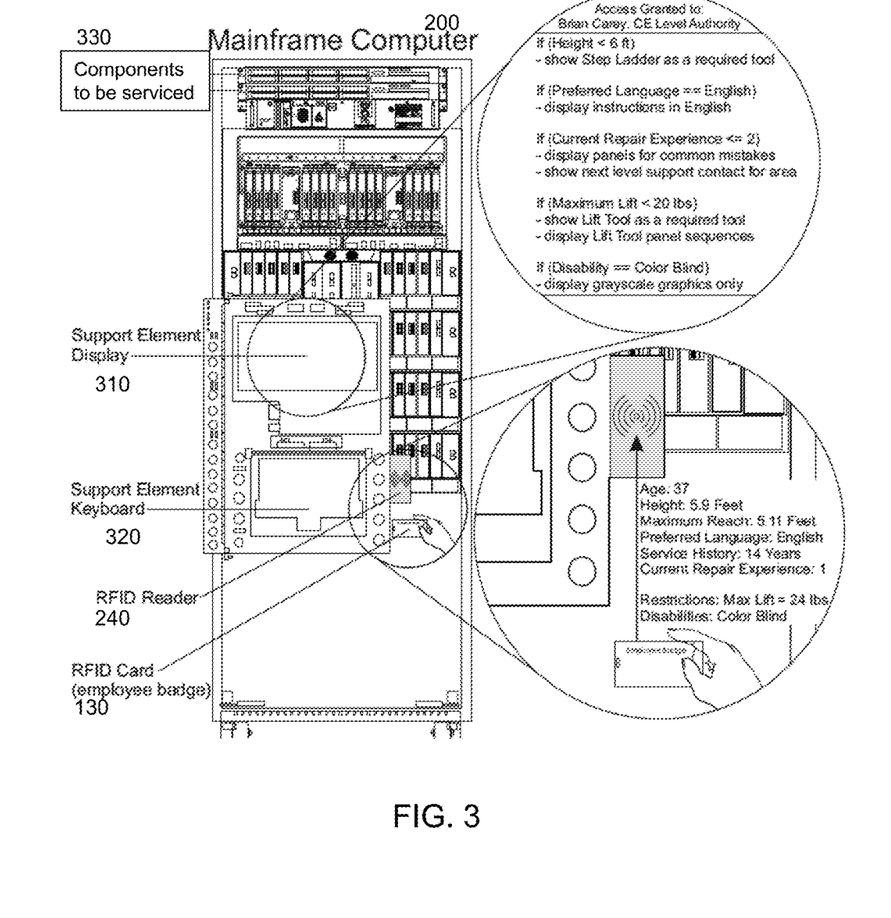
FIG. 3 illustrates an example scenario of granting security access to a system using a tag and customizing the access according to information on the tag.
Figure 4:
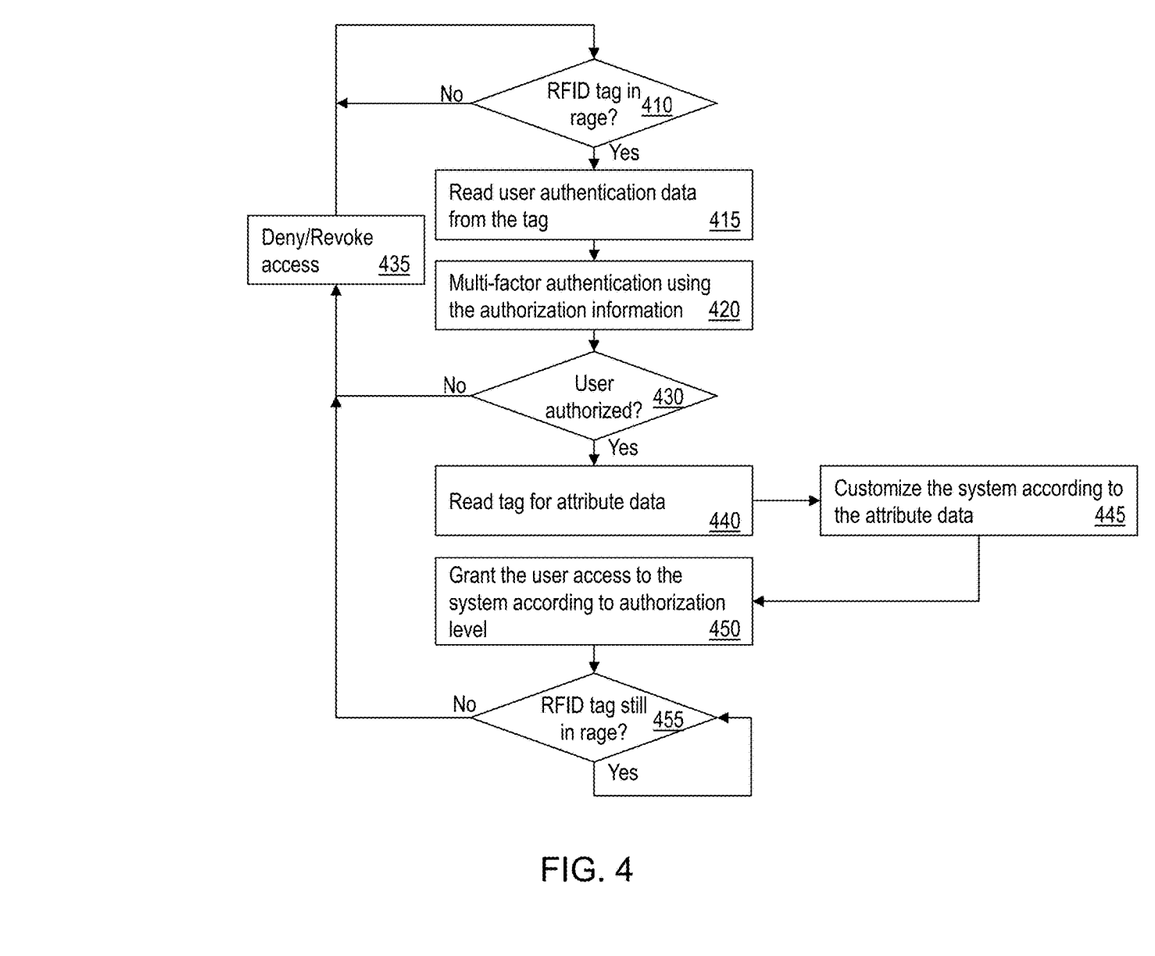
FIG. 4 illustrates a flowchart of an example method for granting security access to a computer using a tag and customizing the access according to attribute information of the tag.

FIG. 3 illustrates an example where the firmware 250 customizes the system 200 according to the attributes read from the RFID tag 130. In the scenario illustrated, consider that the authorized user has to execute one or more service procedures associated with a set of components 330 of the system 200, the system 200 being a mainframe computer in this case. The system 200 includes a display 310 and a keyboard 320 for executing the one or more service procedures. In one or more examples, the display 310 and the keyboard 320 may be specific to the set of components 330. Alternatively, or in addition, the display 310 and the keyboard 320 may be part of a support tool that the authorized user connects to the system for executing the service procedures. FIG. 4 illustrates a flowchart of an example method implemented in this example scenario for customizing the system 200 according to the authorized user. The method may be implemented by the system 200, such as by the firmware 250 by using the processor 210 for execution.

For example, the RFID reader 240 determines whether the RFID tag 130 is within a predetermined range of the system 200, as shown at 410. The RFID reader 240 may be searching at regular intervals, for example polling for RFID tags every half second. Alternatively, the RFID reader 240 may be in a power save mode and prompted by a user to verify the RFID tag 130. If no tag is within the predetermined range, the system 200 remains at decision block 410, waiting and searching for the RFID tag to come within range, as shown at 410.

If the RFID tag 130 is within the predetermined range, the RFID reader 240 reads authentication data from the RFID tag 130, as shown at 415. For example, the RFID reader 240 may read an identification number of the RFID tag 130, which is unique to every RFID tag. Alternatively, the RFID reader 240 may read data from a configurable data area on the tag, where the data may or may not be encrypted. If the data is encrypted, the RFID reader 240 or the firmware 250 has access to an encryption key to decrypt the data.

The firmware 250 uses the authentication data for determining whether the user is authorized to access the system 200, and if so, the authorization level of the user. For example, the firmware 250 performs a multi-factor authentication using the authentication data, along with other information, such as username-password, biometric information of the user and the like, as shown at 420. For example, the firmware 250 may compare the authentication data from the RFID tag 130, along with other data collected from the user, with security access data from a database or file system. The database or file system may be local to the RFID reader 240, located in the system 200, or located in a remote repository at a server.

If the authentication data does not match with the security access data, the user is denied access to the system 200, as shown at 430 and 435. Alternatively, if the authentication data does match with the security access data, the user is granted access to the system 200, as shown at 450. The access granted is based on the user's authorization level as described herein. For example, the authentication data from the RFID tag 130 indicates the individual applications, databases, and/or files that the user may be permitted to access on the system 200. Alternatively, or in addition, the authentication data indicates the hardware components of the system 200 that the user is authorized (and/or not authorized) to access.

Once the user has been granted access to the system 200, the user's RFID tag 130 has to stay within the predetermined proximity range of the system 200 in order for the user to continue to access the system 200. The RFID reader 240 periodically (fixed and/or random intervals) checks that the RFID tag 130 that was granted access is still within the predetermined range of the system 200, as shown at 455. If the RFID tag 130 remains within range, the user's access rights remain valid, and the system 200 remains at decision block 455 to determine whether the RFID tag 130 moves beyond the proximity range.

If the RFID tag 130 moves beyond the range, the user's access rights are revoked, as shown at 455 and 435. For example, the firmware may revoke the access by blanking the screen, logging the user off, providing a warning to return within range within a certain time period or risk being logged off, or in any other manner or a combination thereof. Additionally, the firmware 250 may notify the user that the RFID tag 130 is beyond the proximity range.

In addition, the firmware 250 reads attribute data from the RFID tag 130, as shown at 440. In addition, or alternatively, the firmware 250 reads the attribute data in response to receiving an instruction to initiate execution of a service procedure. For example, the attribute data includes physical attributes of the user such as height, maximum lift, color blindness, handedness, and the like. The attribute data further includes the user's experience with the system 200, such as a number of times the user has serviced a similar type of system as the system 200. The attribute data further includes preference such as preferred language, preferred color, and the like.

The firmware 250 customizes the system 200 according to the attribute data from the RFID tag 130, as shown at 445. The customization includes adapting the user interface according to the physical attributes and/or preferences of the user. Alternatively, or in addition, the customization includes adapting the hardware components of the system 200 according to the physical attributes and/or preferences of the user. Alternatively, or in addition, the customization includes displaying different step-by-step guides for the user to follow for the service procedures to be performed, based on the experience level of the user.

Figure 5:
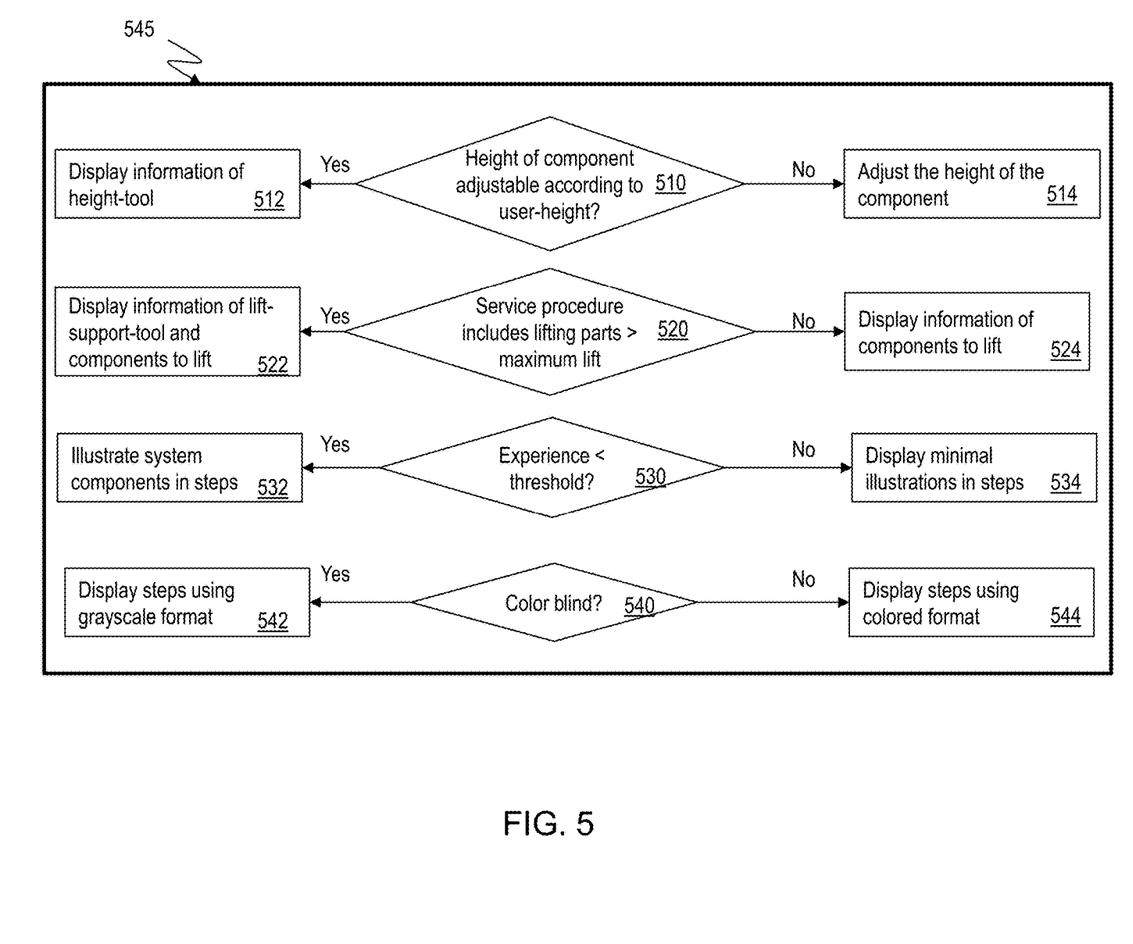
FIG. 5 illustrates a flowchart of an example method for customizing a system according to user attributes read from a tag.

For example, FIG. 5 illustrates a flowchart of an example method for customizing the system 200 according to the attribute data from the RFID tag 130. For example, the firmware 250 checks if the height of one or more components of the system 200 are adjustable, as shown at 510. For example, the firmware 250 may have a list of components that are height-adjustable.

For example, the components that the firmware 250 checks include a display of the system 200. Alternatively, or in addition, the firmware 250 may check if the height of one or more of the components 330 is adjustable. For example, the height is adjustable if the component is mounted on a height-adjustable pedestal that may be moved using a motor, such as an electric or pneumatic motor. In one or more examples, the firmware 250 may send commands to move the pedestal to adjust the height of the component. Accordingly, if the component is height-adjustable, the firmware adjusts the height of the component based on the height of the user that is included in the attribute data from the RFID tag 130, as shown at 514. In one or more examples, the user may adjust the height further via the user-interface. Thus, the firmware 250 customizes the system 200, by adjusting height of one or more components according to the height of the authorized user according to the RFID tag 130.

Alternatively, or in addition, if one or more of the components 330 that the user has to access for the service procedure is not height-adjustable, the firmware 250 displays, via the user interface, information about a height tool such as a ladder, a step-stool, and the like, as shown at 512. For example, the information may include a location, a part number, or other such information about the height tool. In one or more examples, the height tool may be specific for the system 200. For example, the height tool may be made of specific material, or specific dimensions to be used with the system 200.

Further, the customization of the system 200 may depend on the weight of the one or more components that the user has to service. For example, the firmware 250 may include a list of weights of the one or more components of the system 200. In one or more examples, the firmware 250 determines if the weight of one or more of the components 330 is more than a maximum lift of the user, as shown at 520. If a component is heavier than the maximum lift, the firmware 250 changes the user interface to display information of a lift-support tool in addition to locations of the components in the system 200, as shown at 522. For example, the information may include a location, a part number, or other such information about the lift-support tool. In one or more examples, the lift-support tool may be specific for the system 200. For example, the lift-support tool may be made of specific material, or specific dimensions to be used with the system 200. Alternatively, if the components are lighter than the maximum lift, the firmware 250 displays locations of the components, as shown at 524. Accordingly, the firmware 250 customizes the system 200, by changing the user interface, based on the maximum lift of the authorized user according to the RFID tag 130.

Further, the firmware 250 customizes the system 200 according to the experience level of the authorized user. For example, if the experience level of the authorized user is below a predetermined threshold, the firmware 250 may reconfigure the steps of the service procedure that is to be executed. For example, the firmware 250 compares the experience level from the RFID tag of the authorized user and the predetermined threshold, as shown at 530. If the experience level is above the predetermined threshold, the firmware 250 may not alter the steps of the service procedure, which may include minimal illustrations for the steps, as shown at 534. In one or more examples, the firmware 250 may additionally check if the experience level is above a second (higher) threshold (not shown), and in such a case, remove one or more steps to be displayed for the service procedure. Further, in case the experience level of the authorized user is below the first predetermined threshold, the firmware displays an illustrated version of the steps, as shown at 532. For example, the illustrated version may identify locations of the components to be accessed for performing the service procedure(s).

Figure 6:
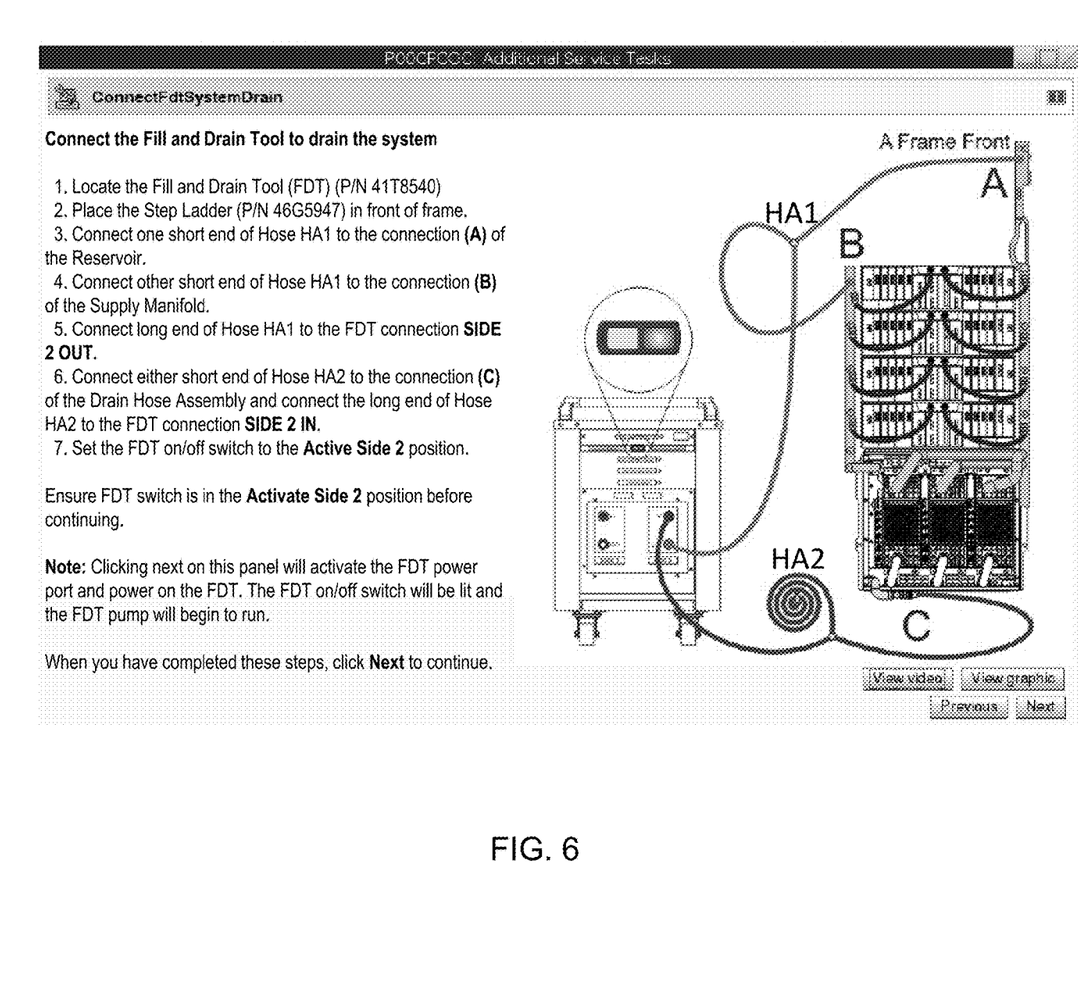
FIG. 6 illustrates an example customized set of service procedure instructions in a panel displayed for a user based on user attributes obtained from a tag of a user.
Figure 7:
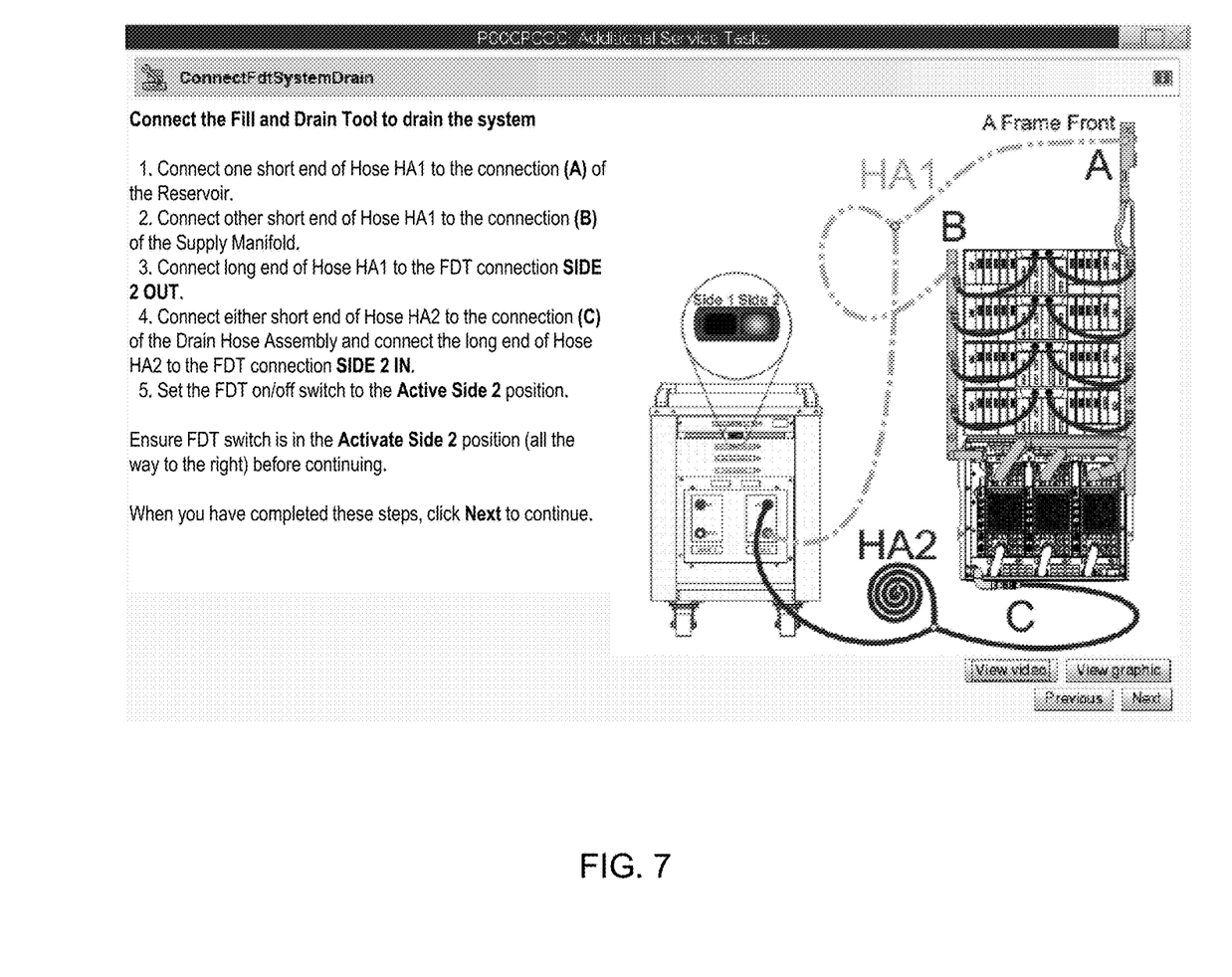
FIG. 7 illustrates an example customized set of service procedure instructions in a panel displayed for a user based on user attributes obtained from a tag of a user.

For example, FIG. 6 and FIG. 7 illustrate two separate steps generated and displayed for two separate authorized users, respectively, based on the respective user's experience levels. As can be seen, FIG. 6 includes additional illustrations of the part names (HA1, HA2), compared with FIG. 7. Further, the step screen in FIG. 6 includes additional informative steps compared to those in FIG. 7. Thus, the firmware 250 customizes the steps of the service procedure that are displayed to the authorized user according to the attribute data from the RFID tag 130.

In addition, or alternatively, the firmware 250 adapts the user interface of the system 200 according to color blindness of the authorized user. For example, the firmware 250 checks if the authorized user is color blind, based on the attribute data from the RFID tag 130, as shown at 540. If the authorized user is not color blind, the firmware 250 continues to display the steps of the service procedure using colors, as shown at 544. Else, if the authorized user is color blind, the firmware 250 changes the user interface to display the contents of the steps of the service procedure using grayscale format, as shown at 542. For example, in addition to changing colors of illustrated components of the steps, for the grayscale formatting, the firmware 250 may change colored lines or shading using patterned or textured format. For example, in FIG. 6 hoses HA1 and HA2 are depicted using colored solid lines, while in FIG. 7, the hoses use grayscale patterned lines instead. Thus, the firmware 250 customizes the system 200 to adapt according to color blindness of the authorized user. In one or more examples, the firmware 250 may store a separate set of illustrations that are used in case the authorized user is color blind. Alternatively, or in addition, the firmware 250 may light system indicators, for example by powering off/on components, and services system components during the step-by-step panel sequence to facilitate the authorized user to identify a component.

It should be noted that the firmware 250 adjusts the system 200 based on additional, fewer, or different attributes than those described herein, such as handedness, language, and so on. For example, table 1 illustrates an example customization that the firmware 250 may use to adjust a sequence of steps of the service procedure(s) displayed based on the language of preference for the authorized user.

TABLE 1

```
<expression name="CheckPreferredLanguage" expr="${psxml.properties.PreferredLanguage}" >
  <navigation>
    <event name="English">
      <action target="EnglishPanelSequence"></action>
```

TABLE 1-continued

```
    </event>
    <event name="French">
      <action target="FrenchPanelSequence"></action>
    </event>
    <event name="German">
      <action target="GermanPanelSequence"></action>
    </event>
  </navigation>
</expression>
```

Further, table 2 illustrates a customization that the firmware 250 uses for adapting the steps displayed based on whether the authorized user is color blind.

TABLE 2

```
<c:if test="${psxml.properties.ColorBlind=='false'}">
<p>Ensure FDT swith is in the <b>Activate Side 2</b> position before continuing.</p>
</c:if>
<c:if test="${psxml.properties.ColorBlind=='true'}">
<p>Ensure FDT swith is in the <b>Activate Side 2</b> position (all the way to the right) before continuing.</p>
</c:if>
```

Further, table 3 illustrates a customization that the firmware 250 uses for adapting the steps displayed based on the experience level of the authorized user.

TABLE 3

```
<c:if test="${psxml.properties.CurrentRepairExperience<='2'}">
<p><b>Note:</b> Clicking next on this panel will activate the FDT power port and power on the FDT. The FDT on/off switch will be lit and the FDT pump will begin to run.</p>
</c:if>
```

It should be noted that the above illustrated customizations are just examples, and that in other examples, the customizations may be different. Further, different, and or additional steps of the service procedures may be customized than the steps illustrated herein.

In another example, referring to the illustrations in FIG. 6 and FIG. 7, consider that a first authorized user in FIG. 6 has the following unique attributes (Language: English, Height: 5 Feet 3 inches, Current Repair Experience: 1, Disabilities: None). Further, assume that a second authorized user in FIG. 7 has the following unique attributes (Language: English, Height: 6 Feet 5 inches, Current Repair Experience: 6, Disabilities: Color Blindness). As can be seen by comparing FIG. 6 and FIG. 7, the panel displayed in FIG. 6 has additional information to help guide the first authorized user who has a lesser experience than the second authorized user with the current repair procedure. FIG. 6 further suggests the use of a step ladder tool to assist the first authorized user in reaching the top connections. The panel in FIG. 7 has minimal information, for example, it does not show tool part numbers or provide an explanation regarding how tools work, because the second authorized user has performed the current service scenario 6 times prior. Further, because the second authorized user is tall enough to reach the top connections, the firmware 250 does not display the instruction to use the step ladder tool. However, because the second authorized user is color blind, the firmware adds to the instructions by showing unique text to help clarify the color-coded switches, as well as a unique graphic that does not rely on the use of colors.

In one or more examples, the firmware 250 customizes the panels or instructions displayed for the service procedures using computer executable instructions, such as in HTML, JAVA, C#, or any other programming language. The firmware 250, based on the attribute data, may replace a single word, sentence, panel title, graphic, video, button, or any other user-interface element. Further, based on the attribute data, the firmware 250 may adjust physical attributes of the system 200 according to the physical attributes of the user.

In one or more examples, emergency contact information for a user's next level of support as well as his/her manager's contact information may be provided by the RFID tag 130, in case problems are detected during the service call.

The technical solutions described herein, thus facilitate authenticating a user, based on a tag unique to the user, such as an RFID tag, to access a system, and in addition, customizing the system based on one or more attributes of the user that are stored on the tag. Particularly, the system may be customized to facilitate a service person, such as a field technician, to execute one or more service procedures on the system in an efficient manner.

For example, sequences of panels displayed by the firmware of the system for showing step-by-step instructions for executing the service procedures are customized according to the attributes. The displayed service procedures include textual instructions, graphics, and/or videos for one or more steps of the service procedure, such as to repair a part in the system. Typically, the procedures are identical for each user and assume that every user has the same experience and attributes. The technical solutions described herein facilitate the firmware of the system, to use a tag reader to access attribute data of the specific user who is physically present and working on the system, and customize the system for the specific user so that the user can service the system more efficiently.

For example, the firmware uses the attribute data in the unique tag accompanied with the user to show personalized service procedure flows. Such a customized flow helps the user to service the system more efficiently. For example, a user with a preferred language is shown service procedures using the preferred language. Further, a user with a known disability, such as not being able to see colors, is shown procedures where color is not the delineation used to distinguish system components. Further, a user may have a lifting restriction, such as because of recent surgery or any other physical limitation, that is different from the majority of users. Accordingly, the firmware may adapt the system or display instructions to address such limitations/restrictions.

For example, a user with physical differences is shown specific text and procedures, such as for additional tools to address accessing system components that they may not be able to access because of the restrictions/limitations. Thus, the technical solutions facilitate the users to execute the service procedures in an efficient manner, thereby reducing system downtime.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for customizing a system for a user, the method comprising:
   receiving, by a processor, attribute data for the user from a tag associated with the user;
   determining, by the processor, a maximum lift of the user;
   generating, by the processor, a set of service procedure instructions comprising a set of steps to be executed by the user to service components of the system, the set of steps being customized for the user based on the attribute data, wherein, in response to the maximum lift being below a predetermined value, generating the set of service procedure instructions comprises, adding instructions identifying a lift-support tool to be used;
   displaying, by the processor, the set of service procedure instructions comprising the set of steps that are customized for the user;
   receiving, by the processor, authentication data for the user from the tag;
   validating, by the processor, authority of the user based on the authentication data, wherein the validating is performed prior to receiving the attribute data; and
   adjusting, by the processor, a position of one or more components of the system based on the attribute data of the user.

2. The computer implemented method of claim 1, wherein the tag is an identification tag of the user.

3. The computer implemented method of claim 1, further comprising:
   determining, by the processor, an experience level of the user; and
   in response to the experience level being below a predetermined threshold, generating the set of service procedure instructions comprises, adding one or more service instructions to the set of service procedure instructions.

4. The computer implemented method of claim 1, further comprising:
   determining, by the processor, a color-blindness of the user; and
   in response to the user being color blind, generating the set of service procedure instructions further comprises, replacing color illustrations in the set of service procedure instructions with grayscale illustrations.

5. A system for customizing components during a service procedure, the system comprising:
   a tag uniquely associated with a user, the tag configured to include authentication data and attribute data for the user;
   a tag reader configured to access data stored in the tag; and
   a processor, in communication with the tag reader, the processor configured to:
   receive attribute data for the user from the tag via the tag reader;
   determine a maximum lift of the user;
   generate a set of service procedure instructions for the service procedure, the set of service procedure instructions comprising a set of steps to be executed by the user to service components of the system, the set of steps being customized for the user based on the attribute data, wherein, in response to the maximum lift being below a predetermined value adding instructions identifying a lift-support tool to be used;
   display the set of service procedure instructions comprising the set of steps that are customized for the user;
   receive the authentication data for the user from the tag via the tag reader;
   validate authorization of the user based on the authentication data, wherein the validation is performed prior to generation of the set of service procedure instructions; and
   adjust a position of one or more components of the system based on the attribute data of the user.

6. The system of claim 5, wherein the processor is further configured to:
   periodically monitor presence of the tag within a predetermined proximity of the system by revalidating the authorization of the user based on the authentication data from the tag.

7. The system of claim 5, wherein the processor is further configured to:
- determine an experience level of the user; and
- in response to the experience level being below a predetermined threshold, generate the set of service procedure instructions by, adding one or more service instructions to the set of service procedure instructions.

8. The system of claim 5, wherein the processor is further configured to:
- determine a color-blindness of the user; and
- in response to the user being color blind, generate the set of service procedure instructions by, replacing color illustrations in the set of service procedure instructions with grayscale illustrations.

9. A computer program product for validating a user for performing a service procedure for a system and customizing components of the system during the service procedure, the computer program product comprising a computer readable storage medium, the computer readable storage medium comprising computer executable instructions, wherein the computer readable storage medium comprises instructions to:
- receive attribute data for the user from a tag, the tag uniquely associated with the user, and the tag including authentication data and attribute data for the user, the attribute data comprising a maximum weight lift of the user;
- generate a set of service procedure instructions for the service procedure, the set of service procedure instructions comprising a set of steps to be executed by the user to service components of the system, the set of steps being customized for the user based on the attribute data, wherein, generating the set of service procedure instructions comprises adding instructions identifying a lift-support tool to be used in response to the maximum weight lift of the user being below a predetermined value;
- display the set of service procedure instructions comprising the set of steps that are customized for the user;
- receive the authentication data for the user from the tag;
- validate authorization of the user based on the authentication data, wherein the validation is performed prior to generation of the set of service procedure instructions; and
- adjust a position of one or more components of the system based on the attribute data of the user.

10. The computer program product of claim 9, wherein the computer readable storage medium comprises instructions to:
- determine an experience level of the user; and
- in response to the experience level being below a predetermined threshold, generate the set of service procedure instructions by, adding one or more service instructions to the set of service procedure instructions.

11. The computer program product of claim 9, wherein the computer readable storage medium comprises instructions to:
- determine a color-blindness of the user; and
- in response to the user being color blind, generate the set of service procedure instructions by, replacing color illustrations in the set of service procedure instructions with grayscale illustrations.

12. A computer implemented method for customizing a service procedure for a user, the method comprising:
- receiving, by a processor, an instruction to initiate execution of the service procedure for a system by the user; and
in response:
  - receiving, by the processor, attribute data for the user, the attribute data comprising a maximum weight lift of the user;
  - customizing, by the processor, the execution of the service procedure comprising a set of steps to be executed by the user to service components of the system, the set of steps being customized based on the attribute data, the customizing comprises adding, to the service procedure, service procedure instructions for identifying a lift-support tool to be used in response to the maximum weight lift of the user being below a predetermined value;
  - displaying, by the processor, a set of service procedure instructions comprising the set of steps that is customized based on the attribute data;
  - receiving, by the processor, authentication data for the user;
  - validating, by the processor, authority of the user based on the authentication data, wherein the validating is performed prior to receiving the attribute data; and
  - adjusting, by the processor, a position of one or more components of the system used for the execution of the service procedure based on the attribute data of the user.

13. The computer implemented method of claim 12, further comprising:
- determining, by the processor, an experience level of the user from the attribute data; and
- in response to the experience level being below a predetermined threshold, customizing the execution of the service procedure comprises, adding one or more service procedure instructions to a default set of service procedure instructions associated with the service procedure.

14. A system for customizing execution of a service procedure, the system comprising:
- a tag uniquely associated with a user, the tag configured to include authentication data and attribute data for the user;
- a tag reader configured to access data stored in the tag; and
- a processor, in communication with the tag reader, the processor configured to:
  - validate authority of the user to initiate execution of a service procedure based on the authentication data of the tag; and
  - in response to the user being authorized:
    - access attribute data for the user from the tag via the tag reader, the attribute data comprising a maximum weight lift of the user;
    - customize a set of service procedure instructions for the service procedure based on the attribute data by adding instructions identifying a lift-support tool to be used in response to the maximum weight lift of the user being below a predetermined value, the set of service procedure instructions comprising a set of steps to be executed by the user to service components of the system; and
    - display the set of service procedure instructions comprising the set of steps that is customized for the user; and
    - adjust a position of one or more components of the system based on the attribute data of the user.

* * * * *